United States Patent
Simpson (12) United States Patent (10) Patent No.: US 7,278,456 B1
(45) Date of Patent: Oct. 9, 2007

(54) TIRE CHAIN AND CABLE INSTALLATION DEVICE AND METHOD

(76) Inventor: Harold G. Simpson, 2311 Fleetwood Dr., San Bruno, CA (US) 94066

( * ) Notice: Subject to any disclaimer, the term of this patent is extended or adjusted under 35 U.S.C. 154(b) by 0 days.

(21) Appl. No.: 11/582,276

(22) Filed: Oct. 16, 2006

(51) Int. Cl.
*B60C 27/00* (2006.01)
*B60C 7/00* (2006.01)

(52) U.S. Cl. .................... 152/225 C; 152/228

(58) Field of Classification Search ............ 152/213 R, 152/216, 213 A, 225 C, 231, 233, 225 R, 152/214, 215
See application file for complete search history.

(56) References Cited

U.S. PATENT DOCUMENTS

| | | | | | |
|---|---|---|---|---|---|
| 1,266,507 | A | * | 5/1918 | Ludwig | 152/213 R |
| 2,445,947 | A | * | 7/1948 | Hoppes | 152/225 C |
| 2,478,335 | A | * | 8/1949 | Stark | 152/241 |
| 2,530,897 | A | * | 11/1950 | Miller | 152/225 C |
| 2,608,234 | A | * | 8/1952 | Hughes | 152/213 R |
| 3,068,925 | A | * | 12/1962 | Stephens | 152/226 |
| 4,244,412 | A | * | 1/1981 | Seggio | 152/218 |
| 4,476,907 | A | * | 10/1984 | Odawara | 152/179 |
| 4,747,437 | A | * | 5/1988 | Magee | 152/225 C |
| 2004/0182488 | A1 | * | 9/2004 | Millar | 152/231 |

FOREIGN PATENT DOCUMENTS

JP          63176706 A  *  7/1988 ................. 152/233

OTHER PUBLICATIONS

"Chain Buddy-Easy Tire Chain Installation Tool Kit", Print-out of www.chainbuddy.com, 6 pages, Sep. 8, 2006.
"Snow chains", Print-out of www.en.wikipedia.org, 2 pages, Sep. 7, 2006.
"Learn2 Install and Remove Snow Chians", Print-out of www1.excite.com, 6 pages, Sep. 7, 2006.
"Car Bibles: The Wheel and Tyre Bible—Tyre constructions", Print-out of www.carbibles.com, 2 pages, Sep. 7, 2006.

* cited by examiner

*Primary Examiner*—Jason R. Bellinger
(74) *Attorney, Agent, or Firm*—Ray K. Shahani, Esq.; Kin Hung Lai (57) ABSTRACT

A tire chain and cable installation device to assist tire chains and cables installation on vehicles with tires or wheels. The tire chain and cable installation device is made of a resilient, flexible clamp portion having two gripping ends formed integrally with the clamp portion, and has a elongated indicator portion extending outwardly from the clamp portion.

10 Claims, 7 Drawing Sheets

TIRE CHAIN AND CABLE INSTALLATION DEVICE AND METHOD

RELATED APPLICATIONS

None

FIELD OF THE INVENTION

This invention relates to a device and method for installation of snow and other type of tire chains and cables on automobiles or other wheeled vehicles more safely and efficiently.

BACKGROUND OF THE INVENTION

Tire chains or snow chains are devices made of chains and/or cables which are temporarily affixed to the wheels of automobiles to provide superior traction when driving through snow and ice. Tire chains are usually attached to the drive wheels of a vehicle, e.g. the front wheels on a front-wheel drive car or the rear wheels on a rear-wheel drive car, though all four wheels may be chained to provide extra stability.

Traditionally, tire chains, whether they are made of chain or cable, are installed manually when they are required. One of the most common installation methods is to lay a tire chain flat either right in front of or behind the wheel and positioned such that the entire length of the tire chain is aligned with the orientation of the tire. Then the vehicle will be propelled slightly forward (chain in front) or backward (chain behind) such that the wheel is essentially directly on top of the tire chain. Afterwards, installer will reach down and take hold of the longest ends of the tire chain, drape them over the tire so that the long strands hang down evenly, one end along the inside (axle side) of the tire and the other end hanging along the outer rim of the tire. Then the two ends need to be fastened and secured to complete the process. Most tire chains feature a hook or a clip which holds the ends of the chains together. Most mechanisms fit through an open link on the other end of the same strand. Then they're closed shut to hold the strands fast. Usually, users should fasten the inside strand first then hook the outer strand. Then move to the other side of the car and repeat the process. Users often find it difficult to fasten the inside (axle side) strands especially when the connection position is too high up from the ground.

However, using the traditional method sometimes frustrates motorists and even imposes danger. Firstly, the driver does not have any visionary reference while trying to roll the vehicle's wheels on top of the tire chain. Consequently, it is not uncommon that either the vehicle is moved too far or not far enough to miss the chain or the wheel lands partially on top of the chain along its width or at an angle. Either way, users often and typically have to yank out the tire chain from beneath the wheels, re-position it and repeat the entire process until the wheel is perfectly aligned with the length of the tire chain. The misalignment situations are even more frequent when users try to install more than one tire chains at a time and/or the surface is inclined or bumpy, or covered with ice and snow. It is not uncommon, especially for drivers traveling alone, to have to get in and out of their vehicles several times to get the installation completed. And because of these frequent in-and-out trips of the vehicles, some users might skip or forget the safety procedure of setting the proper gear, whether it be a manual or automatic transmission, applying the parking brakes or even switching off the engine while trying to fasten the chains. As a result, crushed fingers and feet or even more severe injuries are not uncommon consequences of applying tire chains, also due to vehicles unexpectedly rolling a few inches at the wrong moment, etc.

There are currently various chain installation kits available in the market. They however usually include several mechanical parts and multiple and complicated procedures to allow installation of tire chains.

Figure 1:
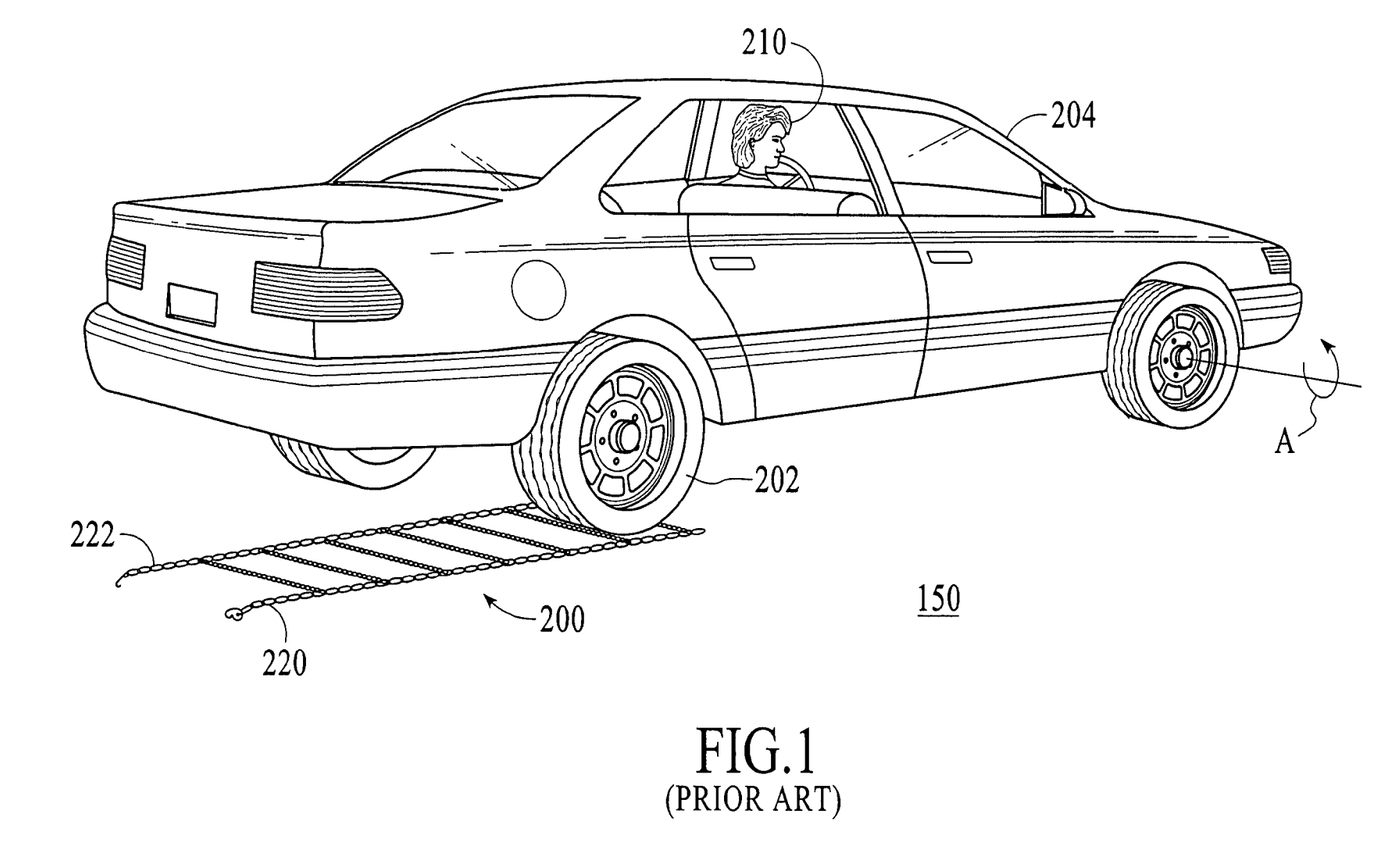
FIG. 1 is a representative schematic view showing the device and method of use of installation of tire chain 200 of the prior art.

FIG. 1 is a representative schematic view showing the device and method of use of installation of tire chain 200 of the prior art. As shown in FIG. 1, tire chain 200 is laid flat behind tire 202. In an embodiment, the entire length of the tire chain 200 is laid out along the orientation of the tire 202. Then user 210 will move vehicle 204 slightly backward onto tire chain 200 such that tire 202 is on top of tire chain 200. As shown in FIG. 1, user 210 has no visionary reference as how far tire 202 has rolled on top of tire chain 200.

In one method of use, user 210 will reach down and take hold of one end of tire chain 200, drape them over tire 202 so that the long strands hang down evenly, one strand adjacent the inside, axle side of tire 202 and the other strand hanging adjacent the outer rim of tire 202. Then the two ends are fastened and secured to complete the process. Most tire chains 200 feature a hook or a clip mechanism which holds the ends of the chains together. Most mechanisms fit through an open link on the other end of the same strand. Then they are coupled to hold the strands together. Usually users 210 fasten the inside strand first then hook the outer strand. Then users 210 move to the other side of vehicle 204 and repeat the process. Users 210 often find it difficult to fasten the inside, axle side strands especially when the connection position is too high up from the ground 150 or directly behind the wheel.

ADVANTAGES AND SUMMARY OF THE INVENTION

The present invention is a device and method to enhance the efficiency and safety in the tire chain installation process.

One object of the present invention is to minimizes the possibility of misalignment of the tire and tire chain by securing one end of the chain on the tire throughout the entire application.

Another object of the present invention is to provide a visual indication that is visible to users while they are in the driver's seat so that users no longer need spotting assistance from other parties from the outside. A further object of the present invention is to avoid dependence on estimation or trial-and-errors while trying to best position the wheel on the tire chain on the ground for installation.

Yet another object of the present invention is to inform the users exactly where the fastening or clip end is relative the tire so that users know exactly when the stop propelling the vehicles. This feature ensures an easy coupling of the two fastening ends.

Yet another object of the present invention is to provide an indicator for the most convenient and easy connection position of the two ends of the tire chain relative to the time, i.e., lower to the ground or higher up the tire, depending upon access provided by the vehicle design, environment or environs, etc.

The present invention provides a more efficient, effective and safer way to install either single or multiple tire chains at the same time. The present invention is a clamp-like device that helps secure one end of the tire chains adjacent both side walls of the tire while the vehicle is moving.

Moreover, the present invention has a visual indicator that is visible to users while they are on the driving, i.e., in the driver's seat.

Further details, objects and advantages of the present invention will be come apparent through the following descriptions, and will be included and incorporated herein.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

It will be understood that in the event parts of different embodiments have similar functions or uses, they may have been given similar or identical reference numerals and descriptions. It will be understood that such duplication of reference numerals is intended solely for efficiency and ease of understanding the present invention, and are not to be construed as limiting in any way, or as implying that the various embodiments themselves are identical.

Figure 2A:
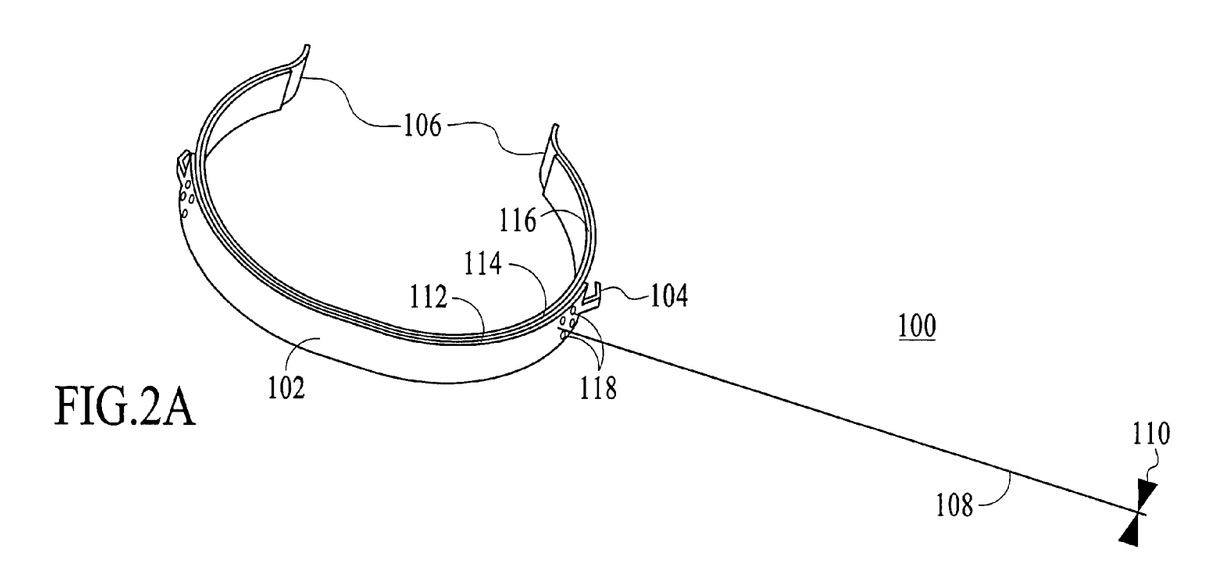
FIG. 2A is a representative isometric view of an embodiment of the tire chain and cable installation device 100 of the present invention.
Figure 2B:
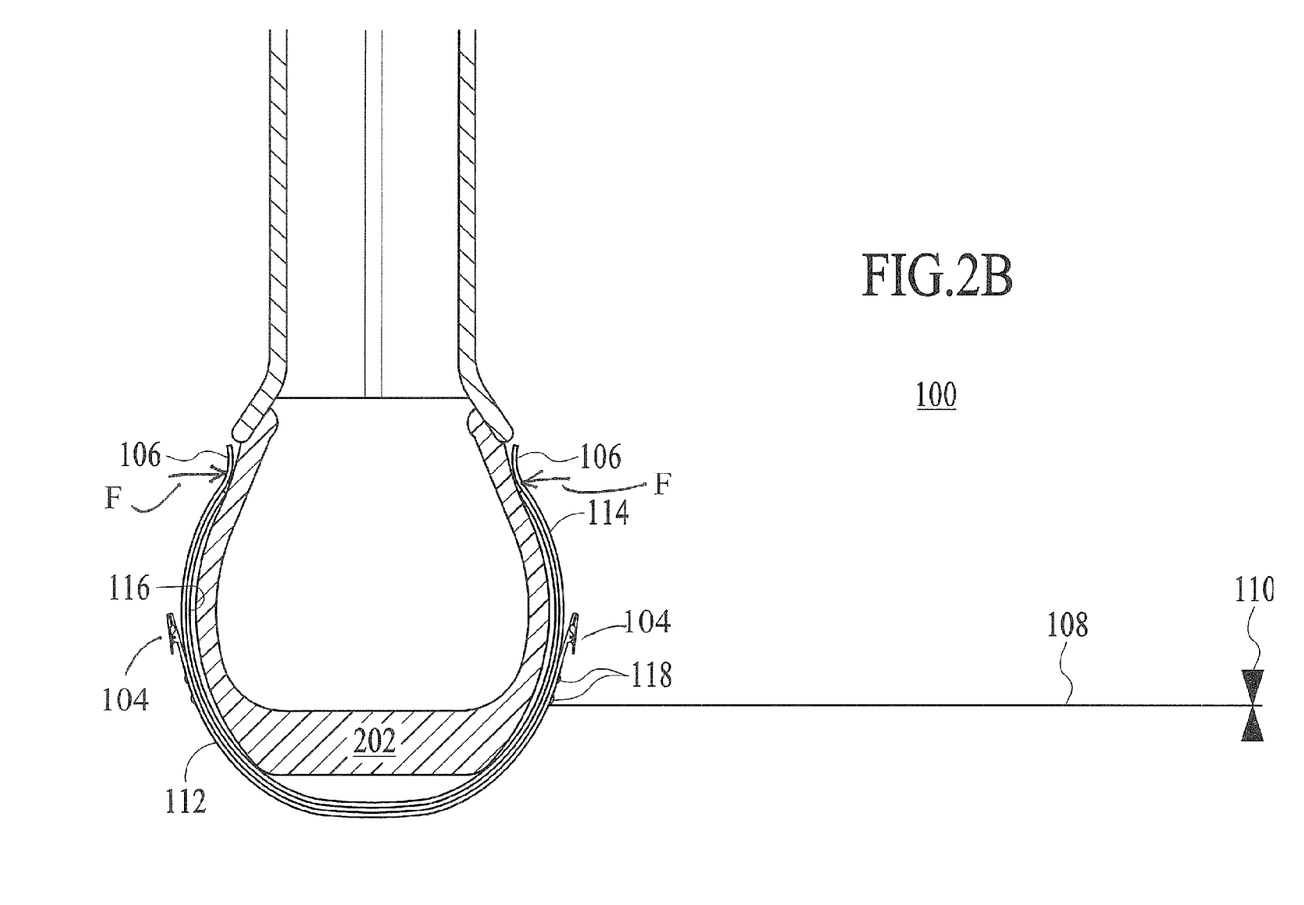
FIG. 2B is a representative side view of an embodiment of the tire chain and cable installation device 100 of the present invention attaching to tire 202 in the secured position.

FIG. 2A is a representative isometric view of an embodiment of the tire chain and cable installation device 100 of the present invention. As shown in FIG. 2A, in an embodiment the tire chain and cable installation device 100 consists of horse shoe clamp portion 102, spring steel wire rod 108 and position flag or marker 110. In an embodiment, horse shoe clamp portion 102 is a three-band construction consists of outer band 112, middle band 114 and inner band 116 in a horse shoe or "C" shape. In an embodiment, outer band 112, middle band 114 and inner band 116 should be made of flexible and elastic materials such as steel and plastic to allow elastic deformation during application and provide clamping strength to secure the tire chain and cable installation device 100 of the present invention to tire 202. As shown in FIGS. 2A and 2B, outer band 112, middle band 114 and inner band 116 are secured together by mechanical means such as rivets 118 clamps, screws, welds or adhesives. In an embodiment, horse shoe clamp portion 102 should be made strong enough to withstand partial weight of vehicle 204 without inelastic or permanent deformation during application. In an alternative embodiment, more layers of band structure can be added to horse shoe clamp portion 102 to attain a desirable degree of strength and flexibility.

As shown best in FIG. 2A, middle band 114 is bent into a horse shoe or "C" shape, with two neck portions 106. In an embodiment, the distance between two neck portions 106 should be slightly less than the thickness of tire 202 in order to achieve and maintain a firm grip on the tire 202. In alternative embodiments, horse shoe clamp portion 102 can be manufactured in difference sizes to best fit tires 202 of different sizes.

As best shown in FIGS. 2A and 2B, outer band 112 is the shortest band in the horse shoe clamp portion 102. In an embodiment, there is a hook device 104 at the tip of each end of the outer band 112. The main function of hook devices 104 is to provide an anchor to secure the two vertical strands of tire chain 200 to horse shoe clamp portion 102, during the rotation of the tire 202. The hooks 104 can also be used as handles when applying the present invention 100 to a tire 202. In an embodiment, hook devices 104 can be a simple hook design and/or other mechanical fastening devices such as spring clips, bulldog clips, alligator clips etc. as long as they keep tire chain 200 securely in place during application and allow easy removal.

Figure 2C:
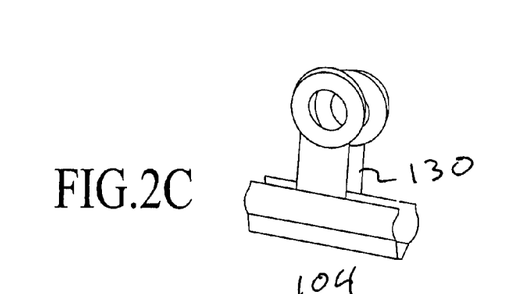
FIG. 2C is a representative side view of an alternative embodiment of hook device 104 of the tire chain and cable installation device 100 of the present invention in the form of an alligator clip.
Figure 2D:
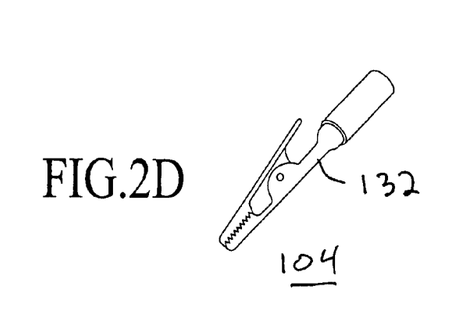
FIG. 2D is a representative side view of an alternative embodiment of hook device 104 of the tire chain and cable installation device 100 of the present invention in the form of a clip.

FIG. 2C is a representative side view of an alternative embodiment of hook device 104 of the tire chain and cable installation device 100 of the present invention in the form of an alligator clip. FIG. 2D is a representative side view of an alternative embodiment of hook device 104 of the tire chain and cable installation device 100 of the present invention in the form of a clip. As best shown in FIGS. 2C and 2D, in alternative embodiments hook devices 104 can also be in the form of a simple clip 130 and an alligator clip 132.

It will be understood based on the foregoing that clips or hooks 104 can be spaced closer or farther from end tips or neck portions 106, as desired. Furthermore, clip portions 104 can be hooks, loops, snaps, etc., and can be positioned facing in a fixed or movable direction or orientation.

As shown in FIG. 2A, in an embodiment, one end of spring steel wire rod 108 is mechanically attached to horse shoe clamp portion 102 at location 118. In an embodiment and as best shown in FIGS. 3B, 3C and 3D, spring steel wire rod 108 extends from horse shoe clamp portion 102 in a way that, when the tire chain and cable installation device 100 of the present invention is attached to tire 202, the length of spring steel wire rod 108 extends approximately or essentially perpendicular to the orientation of tire 202. In an embodiment, position flag or marker 110 is mechanically coupled to the end of spring steel wire rod 108. In an embodiment, position flag or marker 110 can be in any shape and/or made of any durable material as long as it provides a clear visual reference to user 210. Ideally, position flag or marker 110 should be in bright color such as safety orange or yellow. In an embodiment, the length of spring steel wire rod 108 should be about 1.5 ft or more or less, and long enough that users 210 have a good and clear view of position flag or marker 110 in the side mirrors 212, whether tire chain and cable installation device 100 of the present invention is applied to tires 202 on the driver's side or the passenger's side of the vehicle 204.

FIG. 2B is a representative side view of an embodiment of the tire chain and cable installation device 100 of the present invention attaching to tire 202 in the secured position. In an embodiment, the tire chain and cable installation device 100 of the present invention can be secured to tire 202 perpendicularly and clamped onto the tire 202 at the two side walls of tire 202. In an embodiment, the distance between two neck portions 106 should be slightly less than the width of tire 202. In an embodiment, two neck portions 106 should grip tire 202 near the rim of tire 202. As shown in FIG. 2B, while tire chain and cable installation device 100 is secured to tire 202, tire 202 is squeezed by neck portions 106 in direction F. In an embodiment, tire chain and cable installation device 100 of the present invention is made of elastic material. As a result, mechanical grip is generated between neck portions 106 and the side walls of tire 202 which secures the locking position of tire chain and cable installation device 100 of the present invention.

It will be understood based on the foregoing that the tire chain installation device 100 of the present invention will grip the tire 202 more or less contiguously around the girth of the tire 202, depending upon diameter and flexibility of arcuate portion 102, size of tire 202, etc.

Figure 3A:
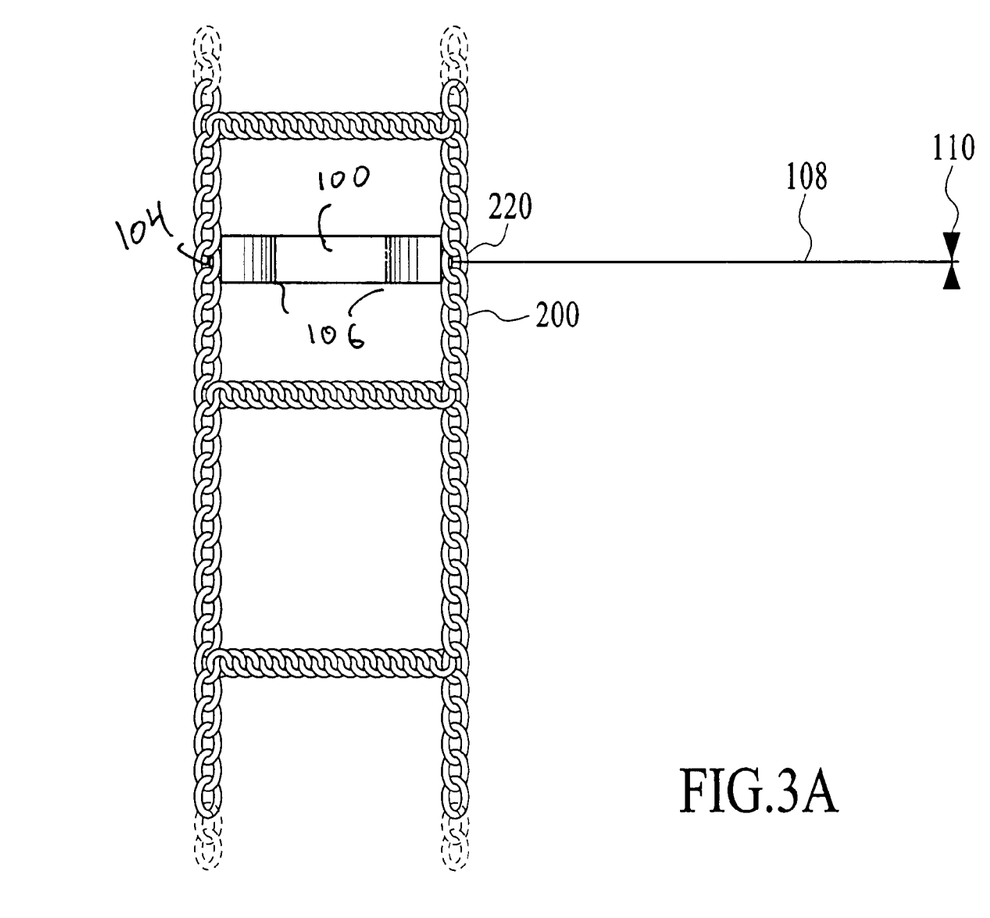
FIG. 3A is a representative side view of an embodiment showing a method of securing a regular tire chain 200 to the tire chain and cable installation device 100 of the present invention.
Figure 3B:
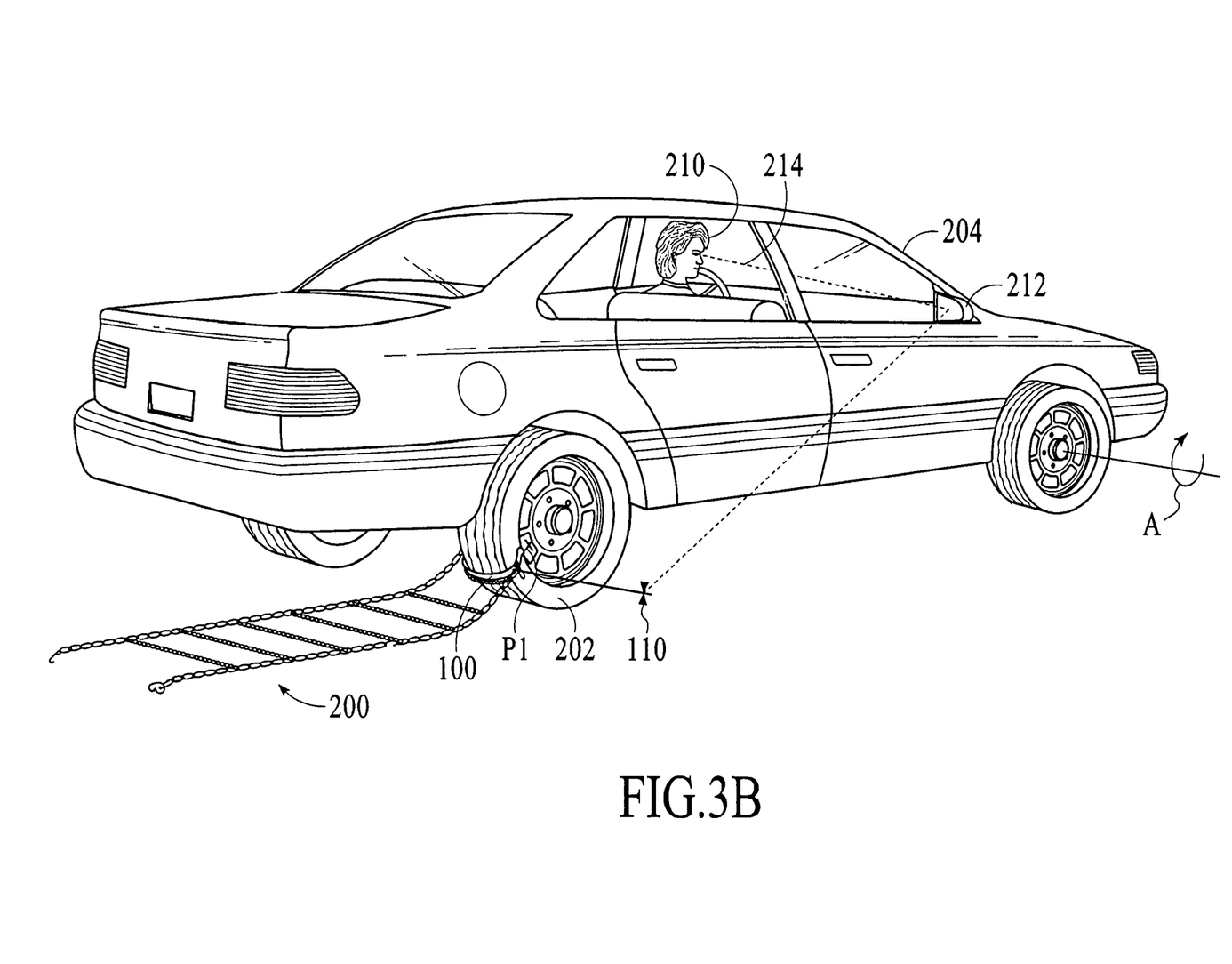
FIG. 3B an embodiment of a method of use of the tire chain and cable installation device 100 of the present invention.
Figure 3C:
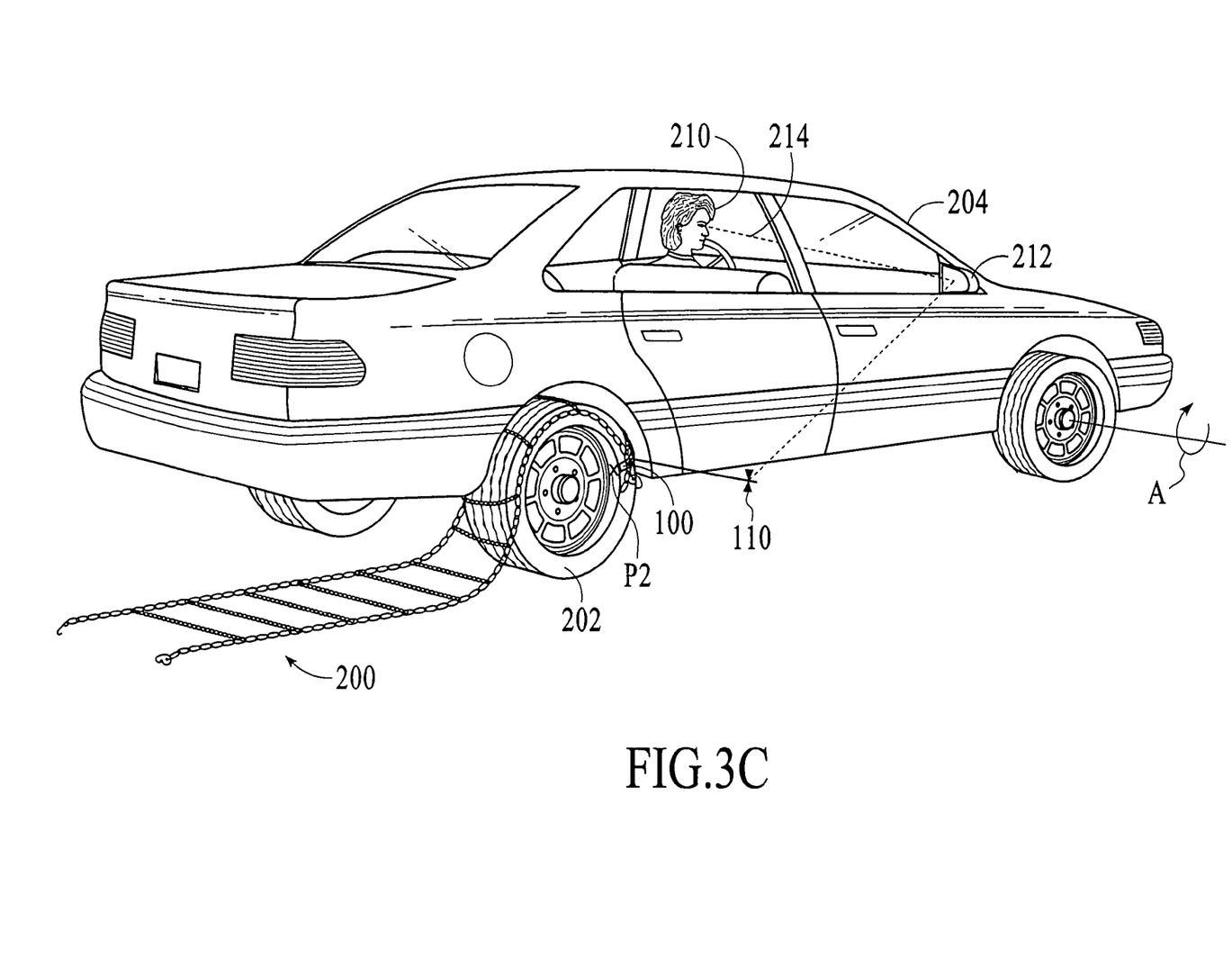
FIG. 3C shows another embodiment of a method of use of the tire chain and cable installation device 100 of the present invention.
Figure 3D:
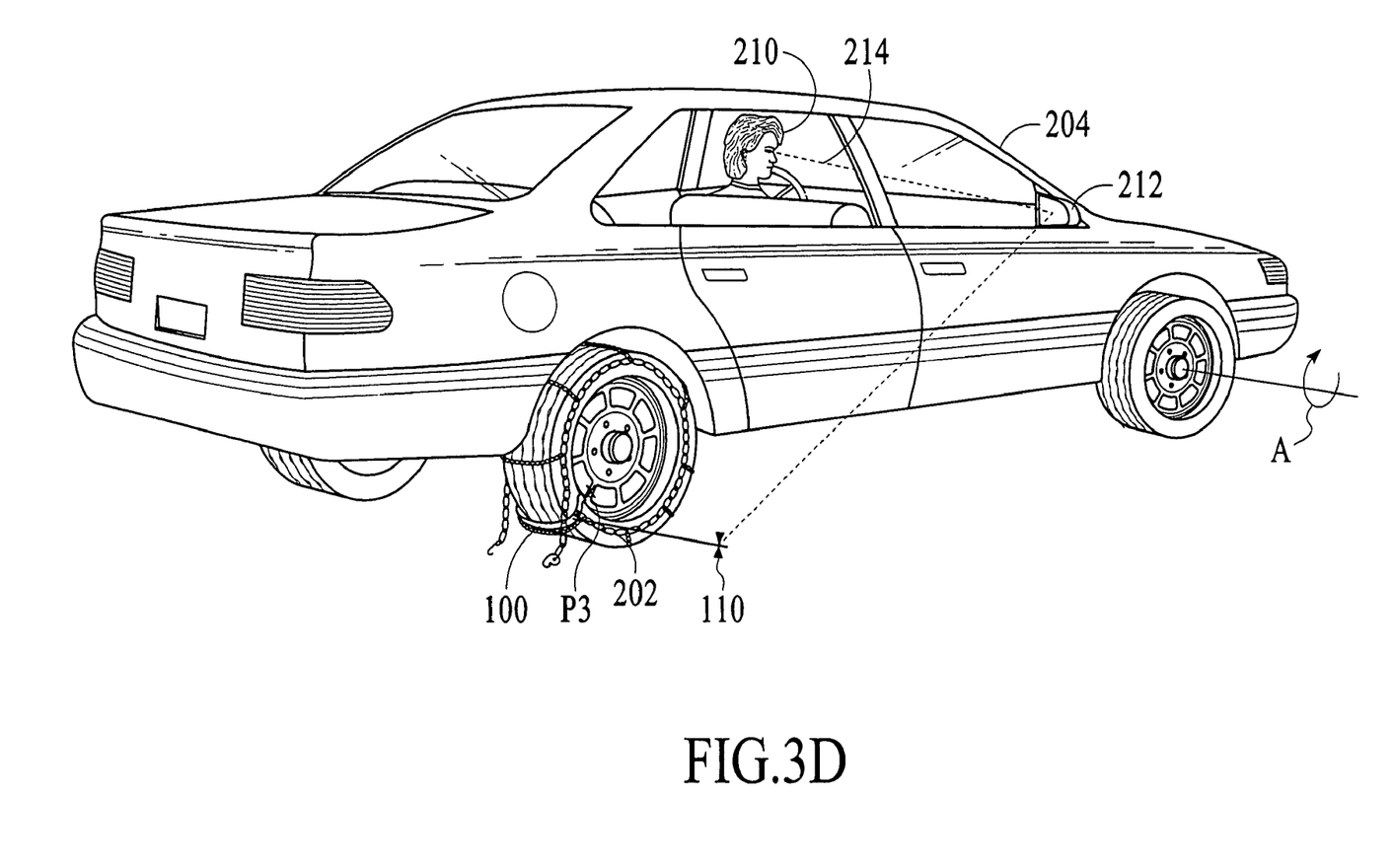
FIG. 3D shows yet another step in a method of use of the tire chain and cable installation device 100 of the present invention.

FIG. 3A is a representative side view of an embodiment showing a method of securing a regular tire chain 200 to the tire chain and cable installation device 100 of the present invention. As shown in FIG. 3A, tire chain 200 is attached to tire chain and cable installation device 100 by fastening the two strands 220 and 222 to the two hooking devices 104 of the tire chain and cable installation device 100 of the present invention. In an embodiment, tire chain 200 should be fastened to the two hooking devices 104 of the tire chain and cable installation device 100 at the positions right behind the first cross link 302 of tire chain 200 on strands 220 and 222 respectively.

FIG. 3B an embodiment of a method of use of the tire chain and cable installation device 100 of the present invention. As shown in FIG. 3B, once tire chain 200 is fastened to tire chain and cable installation device 100, the entire embodiment is then clipped to the side of tire 202 that tire chain 200 is installed to. In an embodiment, tire chain and cable installation device 100 is attached to tire 202 such that spring steel wire rod 108 and position flag or marker 110 thereof are extended perpendicularly away from vehicle 204. As shown in FIG. 3B, position flag or marker 110 serves as position reference of the tire chain and cable installation device 100 on the tire 202. In one method of use, the entire tire chain 200 is laid out flat on the ground 150 and along the orientation or tire track of tire 202. In one method of use, tire chain and cable installation device 100 is attached to the rear half of tire 202 at position P1 and tire chain 200 is laid behind tire 202, and the vehicle 204 is propelled or moved forward for installation.

It will be understood that in the method shown in FIG. 3B, the installation device 100 needs to grip strong enough to the tire 202 to keep it on place while dragging the entire weight and length of the tire chain 200. In another method of the present invention, tire chain 200 can be placed more or less in a pile directly behind tire 202 rather than spread out in a long trail as shown in FIG. 3B, thus reducing the dragging force on the installation device 100 and minimizing the risk of dislodging the device 100 from the tire 202 unintentionally.

In an alternative method of use, tire chain and cable installation device 100 is attached to the front half of tire 202 and tire chain 200 is laid in front of tire 202, then the vehicle 204 is moved backward for installation. In an embodiment, P1 can be anywhere along the rear half of tire 202 for forward rotation and the front half of tire 202 for backward rotation. However, attachment of tire chain and cable installation device 100 to tire 202 is generally easier if position P1 is lower to the ground 150. It will be understood that the methods of use described herein may be modified by the user, and preferences for driving forward on tire chain 200 or backward onto tire chain 200, etc. can all be accommodated.

As best shown in FIGS. 3B, 3C and 3D, user 210 has a clear vision of position flag or marker 110 along visual path 214 at all time when vehicle 204 is propelled either forward or backward. In an embodiment, user 210 no longer requires outside assistance, experience and/or feeling to tell how much tire 202 has been rotated.

FIG. 3C shows another embodiment of a method of use of the tire chain and cable installation device 100 of the present invention. As shown in FIG. 3C, in an embodiment, when vehicle 204 is moved forward, tire 202 is rotated in direction A. Subsequently, tire chain and cable installation device 100 of the present invention with tire chain 200 will reach position P2 and tire chain 200 wrap around tire 202 along the process. In an embodiment, user 210 has continuous and clear vision of position change of position flag or marker 110 and henceforth tire chain and cable installation device 100 of the present invention.

FIG. 3D shows yet another step in a method of use of the tire chain and cable installation device 100 of the present invention. As shown in FIGS. 3C and 3D, while tire 202 is rotated forward, since tire chain 200 is fastened firmly on tire chain and cable installation device 100 of the present invention at both strands 220, tire chain 200 will be wrapped over tire 200 as intended. Subsequently, tire chain and cable installation device 100 of the present invention with tire chain 200 will go under tire 202 while traveling from P2 to P3. As shown in FIG. 3D, since user 210 has a clear vision of position flag or marker 110 along visual path 214 at all time when vehicle 204 is re-located forward, the driver can determine when it is best to stop the vehicle 204 at finishing position P3. Finishing position P3 can be anywhere as long as tire chain and cable installation device 100 of the present invention has gone under tire 202 at least once. However, in one method of use, finishing position P3 is close to starting position P1 and tire chain 200 would have wrapped around most of tire 202. In another method of use, finishing position P3 is low and close to ground 150 for easy closing and locking of tire chain 200 together, especially the strand 222 that is located in the inside/axle side of the tire 202.

In an embodiment, once user 210 determines that ideal finishing position P3 is attained, he or she should switch off the engine and applies parking brake for safety purposes to secure the position of vehicle 204. In one method of use, user 210 can then secure the two ends 220 and 222 of tire chain 200 manually as recommended by tire chain 200 manufacturer. Then, user 210 can disengage tire chain 200 from tire chain and cable installation device 100. Finally, tire chain and cable installation device 100 can be removed from tire 202.

In an alternative embodiment, method of use shown in FIGS. 3B, 3C and 3D can be reversed by attaching tire chain and cable installation device 100 with tire chain 200 extending in front of tire 202 and reversing vehicle 204. This method of use could be particularly useful if installing tire chains 200 on an upward slope.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A tire chain and cable installation device to assist installation of the tire chain and cable on vehicles with tires or wheels, the tire chain and cable installation device comprising:
    a resilient, flexible clamp portion having two gripping ends, the two gripping ends formed integrally with the clamp portion, the two gripping ends spaced to provide a removable grip on a tire or wheel of a vehicle when in place;
    two clip devices, one of the two clip devices located adjacent each gripping end on opposing ends of the clamp portion; and
    an elongated rod indicator portion extending outwardly from the clamp portion in a direction perpendicular to the tire away from the vehicle.

2. A tire chain and cable installation device to assist installation of the tire chain on vehicles with tires or wheels, the tire chain and cable installation device comprising:
    a resilient, flexible clamp portion having two gripping ends, the two gripping ends formed integrally with the clamp portion, the two gripping ends spaced to provide a removable grip on a tire or wheel of a vehicle when in place;
    two clip devices, one of the two clip devices located adjacent each gripping end on opposing ends of the clamp portion; and
    an elongated rod indicator portion extending outwardly from the clamp portion perpendicular to the tire away from the vehicle, wherein the flexible clamp portion can be removably clamped over the tire or wheel of the vehicle at an angle essentially perpendicular to the direction of rotation of the tire or wheel and two strands at one end of a set of tire chains can be temporarily coupled to the clip devices, such that once the remainder of the tire chain has been laid out essentially flat in the path of the tire or wheel and the vehicle moved such that the tire chain is dragged up and over the tire or wheel essentially in place for coupling to the tire or wheel directly, the opposing ends of the two strands of the tire chains can be coupled together to complete the installation of the tire chains and the tire chain and cable installation device removed from the tire or wheel.

3. The tire chain and cable installation device of claim 1 in which the flexible clamp portion is formed using flexible material.

4. The tire chain and cable installation device of claim 1 in which the flexible clamp portion is formed using multiple layers of flexible material.

5. The tire chain and cable installation device of claim 1 in which the shape of the flexible clamp portion is selected from the group of shapes including arcuate, semi-circular, "C" shaped, and horseshoe shaped.

6. The tire chain and cable installation device of claim 1 in which the clip devices are selected from the group consisting of open hooks, alligator clips and spring clips.

7. The tire chain and cable installation device of claim 1 in which the elongated indicator portion comprises an extender portion and a marker portion.

8. The tire chain and cable installation device of claim 3 in which the indicator portion comprises a flexible wire rod.

9. A method of installing tire chains on vehicles with tires or wheels, the method comprising the following steps:
    obtaining a tire chain and cable installation device comprising (1) a resilient, flexible clamp portion having two gripping ends, the two gripping ends formed integrally with the clamp portion, the two gripping ends spaced to provide a removable grip on a tire or wheel of a vehicle when in place, (2) two clip devices located adjacent each gripping end on opposing ends of the clamp portion; and (3) an elongated rod indicator portion extending outwardly from the clamp portion perpendicular to the tire away from the vehicle;
    removably clamping the tire chain and cable installation device over the tire or wheel of the vehicle at an angle essentially perpendicular to the direction of rotation of the tire or wheel;
    temporarily coupling the two strands of chains at one end of a set of tire chains to the clip devices;
    laying out the remainder of the tire chain in an essentially flat orientation in the projected path of the tire or wheel;
    moving the vehicle such that the tire chain is dragged up and over the tire or wheel;
    coupling the opposing ends of the two strands of the tire chains together thus completing the installation of the tire chains to the tire or wheel directly; and
    removing the tire chain and cable installation device from the tire or wheel.

10. The method of claim 9 in which the vehicle is moved a distance roughly equivalent to the circumference of the tire.

* * * * *